US011995522B2

(12) United States Patent
Lourentzou et al.

(10) Patent No.: US 11,995,522 B2
(45) Date of Patent: May 28, 2024

(54) IDENTIFYING SIMILARITY MATRIX FOR DERIVED PERCEPTIONS

(71) Applicant: International Business Machines Corporation, Armonk, NY (US)

(72) Inventors: Ismini Lourentzou, San Jose, CA (US); Daniel Gruhl, San Jose, CA (US); Steven R. Welch, Gilroy, CA (US); Chad Eric DeLuca, Morgan Hill, CA (US); Alfredo Alba, Morgan Hill, CA (US); Linda Ha Kato, San Jose, CA (US); Petar Ristoski, San Jose, CA (US); Anna Lisa Gentile, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 908 days.

(21) Appl. No.: 17/038,126

(22) Filed: Sep. 30, 2020

(65) Prior Publication Data

US 2022/0101188 A1    Mar. 31, 2022

(51) Int. Cl.
*G06N 20/00*    (2019.01)
*G06F 16/242*    (2019.01)
(Continued)

(52) U.S. Cl.
CPC .......... *G06N 20/00* (2019.01); *G06F 16/243* (2019.01); *G06F 18/217* (2023.01); *G06F 18/22* (2023.01); *G06F 40/205* (2020.01)

(58) Field of Classification Search
CPC ..... G06N 20/00; G06F 16/243; G06F 40/205; G06F 18/22; G06F 18/217
See application file for complete search history.

(56) References Cited

U.S. PATENT DOCUMENTS 9,396,439 B2    7/2016   Ebadollahi et al.
10,580,035 B2    3/2020   Mehanian et al.
(Continued)

OTHER PUBLICATIONS

Kleinberg et al.; "Bandits And Experts In Metric Space*", Apr. 15, 2019.
(Continued)

*Primary Examiner* — Mahelet Shiberou
(74) *Attorney, Agent, or Firm* — Garg Law Firm, PLLC; Rakesh Garg; Peter Edwards

(57) ABSTRACT

An embodiment includes generating a query prompting a user to select from among a plurality of response options related to a first query set of objects. The embodiment also receives, responsive to the query, user input representative of a selected response option selected by the user from among the plurality of response options. The embodiment also calculates a plurality of weight values for respective ones of a plurality of similarity matrices based on the selected response option, where the plurality of similarity matrices include respective sets of similarity values, each set of similarity values comprising similarity values representative of similarities of respective pairs of the plurality of objects. The embodiment stores a designated similarity matrix that is selected from among the plurality of similarity matrices based at least in part on a weight value from among the plurality of weight values assigned to the designated similarity matrix.

18 Claims, 9 Drawing Sheets

(51) Int. Cl.
 G06F 18/21 (2023.01)
 G06F 18/22 (2023.01)
 G06F 40/205 (2020.01)

(56) References Cited

U.S. PATENT DOCUMENTS

| | | | |
|---|---|---|---|
| 10,635,707 | B2 | 4/2020 | Perez et al. |
| 2015/0051973 | A1 | 2/2015 | Li et al. |
| 2015/0095271 | A1 | 4/2015 | Ioannidis et al. |
| 2017/0103413 | A1 | 4/2017 | He et al. |
| 2017/0147544 | A1* | 5/2017 | Modani .................. G06N 5/022 |
| 2018/0039910 | A1 | 2/2018 | Hari Haran et al. |
| 2019/0244110 | A1 | 8/2019 | Qiu et al. |
| 2019/0266257 | A1 | 8/2019 | Natchu et al. |
| 2019/0303994 | A1 | 10/2019 | Sesia et al. |
| 2020/0012681 | A1 | 1/2020 | McInerney et al. |
| 2020/0074504 | A1 | 3/2020 | Cao et al. |
| 2022/0035800 | A1* | 2/2022 | Dym ........................ G06F 9/505 |
| 2022/0129709 | A1* | 4/2022 | Canal ....................... G06F 17/11 |

OTHER PUBLICATIONS

Deshmukh et al.; "Self-Supervised Contextual Bandits In Computer Vision", Mar. 18, 2020.
Huang et al.; "Exploring Expert Cognition For Attributed Network Embedding", WSDM'18, Feb. 5-9, 2018, Marina Del Rey, CA, USA.
McMahan et al.; "Tighter Bounds For Multi-Arm Bandits With Expert Advice", Mar. 21, 2014.
Agarwal et al.; "Taming The Monster: A Fast And Simple Algorithm For Contextual Bandits", Proceedings of the 31st International Conference on Machine Learning, Beijing, China, 2014, JMLR: W&CP vol. 32.
Le et al., Learning multiple maps from conditional ordinal triplets, Proceedings of the Twenty-Eighth International Joint Conference on Artificial Intelligence (IJCAI-19), Aug. 2019, pp. 2815-2822.
Bai et al., Multidimensional Scaling on Multiple Input Distance Matrices, In Thirty-First AAAI Conference on Artificial Intelligence, 2017.
Wang et al., Orderly Subspace Clustering, The Thirty-Third AAAI Conference on Artificial Intelligence (AAAI-19), pp. 5264-5272, 2019.
Zhang et al., Jointly Learning Multiple Measures of Similarities from Triplet Comparisons, 2015.
Anderton et al., Revealing the Basis: Ordinal Embedding through Geometry, May 19, 2018.
Haghiri, Estimation of perceptual scales using ordinal embedding, pp. 1-25, May 2019.
Zeng et al., Bundle Optimization for Multi-aspect Embedding, 2017.
Jamieson et al., Low-dimensional embedding using adaptively selected ordinal data, 2011 49th Annual Allerton Conference on Communication, Control, and Computing, Allerton 2011, pp. 1077-1084, 2011.
Xiong et al., Active Metric Learning from Relative Comparisons, 2014.
Anderton et al., Scaling up ordinal embedding: A landmark approach. 36th International Conference on Machine Learning, ICML 2019, Jun. 2019, 416-424, 2019.
Lohaus et al., Uncertainty Estimates for Ordinal Embeddings, 2019.
Canal et al., Active Ordinal Querying for Tuplewise Similarity Learning, 2015.
Li et al., Simultaneous clustering and ranking from pairwise comparisons, Proceedings of the Twenty-Seventh International Joint Conference on Artificial Intelligence (IJCAI-18), Jul. 2018, pp. 1554-1560, 2018.
Canal et al., Active embedding search via noisy paired comparisons, May 27, 2019.
Jamieson et al., Active Ranking using Pairwise Comparisons, Dec. 10, 2011.
Wang et al., Adversarial Preference Learning with Pairwise Comparisons, MM '19, Oct. 21-25, 2019, Nice, France, Session 2B: Adversarial Learning.
Yi et al., Inferring Users' Preferences from Crowdsourced Pairwise Comparisons: A Matrix Completion Approach, HCOMP, 2013.
Amid et al., A kernel-learning approach to semi-supervised clustering with relative distance comparisons, Int. Joint European Conference on Machine Learning and Knowledge Discovery in Databases, 2015.
Pei et al., Comparing clustering with pairwise and relative constraints: A unified framework, ACM Transactions on Knowledge Discovery from Data, vol. 11, No. 2, Article 22, Dec. 2016.
Beygelzimer et al., Contextual Bandit Algorithms with Supervised Learning Guarantees, Proceedings of the 14thInternational Conference on Artificial Intelligence and Statistics (AISTATS) 2011, Fort Lauderdale, FL, USA.
Ye et al., WhatMakes Objects Similar: A Unified Multi-Metric Learning Approach, 29th Conference on Neural Information Processing Systems (NIPS 2016), Barcelona, Spain, 2016.
Ahmad et al., Efficient Data Analytics on Augmented Similarity Triplets, Dec. 27, 2019.
Zhao et al., An Adversarial Approach to Hard Triplet Generation, Lecture Notes in Computer Science (Including Subseries Lecture Notes in Artificial Intelligence and Lecture Notes in Bioinformatics), 11213 LNCS, 2018.
Liang et al., Dynamic Sampling for Deep Metric Learning, Sep. 11, 2020.
Musgrave et al., A Metric Learning Reality Check, Jul. 24, 2020.
Gu et al., Symmetrical Synthesis for Deep Metric Learning, Apr. 23, 2020.
Roth et al., PADS Policy-Adapted Sampling for Visual Similarity Learning, Mar. 28, 2020.
Yoshida et al., Safe triplet screening for distance metric learning, KDD 2018, pp. 2653-2662, Aug. 19-23, 2018, London, United Kingdom.
Sohn, Improved Deep Metric Learning with Multi-class N-pair Loss Objective, 30th Conference on Neural Information Processing Systems (NIPS 2016), Barcelona, Spain, 2016.
Hajiseyedjavadi et al., Learning embeddings for multiplex networks using triplet loss, Applied Network Science, 4 (1), 125, 2019.
Veit et al., Conditional Similarity Networks, Apr. 10, 2017.

* cited by examiner

IDENTIFYING SIMILARITY MATRIX FOR DERIVED PERCEPTIONS

BACKGROUND

The present invention relates generally to a method, system, and computer program product for defining relative similarities for machine learning algorithms. More particularly, the present invention relates to a method, system, and computer program product for identifying similarity matrix for derived perceptions.

Machine learning has become one of the most popular data analysis and decision making support tool in recent years. Many different machine learning techniques rely, at their most basic level, on a distance between pairs of data points in a set of data as a measure of similarity. Similarity between items is an important input to a wide range of applications such as ranking, classification and clustering. Several machine learning algorithms depend on pairwise distances of data points, where the use of an appropriate distance metric can result in better predictive performance. Defining a good notion of similarity over a set of objects that can capture the underlying manifold properties has gained increasing popularity.

While many machine learning frameworks, e.g. clustering, ranking, graphs, are driven by a "distance metric" that defines how related any pair of objects are, defining this "distance" presents a challenge because this "distance" depends on the context or the application used, as well as the Subject Matter Expert's (SME) view who is the primary user of the system. For example, with the advent of embedding spaces, several similarity metrics have been proposed, from Euclidean to cosine distances. However, there is no specific metric that works well for all tasks, and the implementation decisions for such things as parameters, distance metric, and underlying corpus are typically predefined without taking into consideration the SME's perspective.

From a user's perspective, the notion of similarity might not coincide with any of the "distances" found in literature. For example, in domains such as chemistry, a similarity can be defined for comparing molecules, but ultimately two molecules may be far (relatively different) or close (relatively similar) to each other depending on the user's choice of properties to use as a basis for comparison (e.g., two molecules may be similar in pH, but different in color). Similarly, when deciding how to organize a closet, a user may categorize clothes based on functionality (bottoms, tops, accessories) or based on seasons (winter, spring, summer), essentially defining unique embedding spaces with different similarities among objects.

Several works incorporate the SME in the process of creating an embedding space by prompting the user to answer questions on similarities between triplets of objects, for example "Is A closer to B than C," which is much easier than asking the user to define an exact similarity between two objects. However, the selection of these triplet questions is random, resulting in redundant questions and less-than-efficient algorithms. In addition, such methods involve generating a new embedding space from scratch. Finally, there is a common assumption that the user will know the answer to each question, while in reality several triplet questions could be difficult for the user to answer with high confidence.

SUMMARY

The illustrative embodiments provide for identifying a similarity matrix for derived perceptions. An embodiment includes generating a query prompting a user to select from among a plurality of response options related to a first query set of objects, where the first query set of objects are from object data that is representative of a plurality of objects. The embodiment also includes receiving, responsive to the query, user input representative of a selected response option selected by the user from among the plurality of response options. The embodiment also includes calculating, responsive to the user input, a plurality of weight values for respective ones of a plurality of similarity matrices based on the selected response option, where the plurality of similarity matrices include respective different sets of similarity values, each set of similarity values comprising similarity values representative of similarities of respective pairs of the plurality of objects. The embodiment also includes storing a designated similarity matrix from among the plurality of similarity matrices, the designated similarity matrix being designated from among the plurality of similarity matrices based at least in part on a weight value from among the plurality of weight values assigned to the designated similarity matrix.

Some embodiments further comprise receiving a request for a user-specific input for a machine learning algorithm, where the request comprises at least a portion of the object data. In some such embodiments, the request further comprises at least one of the plurality of similarity matrices. Some such embodiments further comprise initializing a budget value responsive to receiving the request, and repeating the generating of the query for a number of iterations that does not exceed the budget value, each iteration comprising prompting the user with respective unique query sets of objects. Some such embodiments further comprise modifying input data for a machine-learning algorithm using the designated similarity matrix, where, in some such embodiments, the machine-learning algorithm includes natural language processing that processes text using the designated similarity matrix.

Some embodiments further comprise calculating, responsive to the user input, a plurality of reward values for respective ones of the plurality of similarity matrices based on the selected response option. In some such embodiments, the reward values are based at least in part on a number of similarity matrices that agree with the selected response option.

In some embodiments, the first query set of objects comprises a first object, a second object, and a third object, and the plurality of response options comprises a first response option indicating that the first object and the second object are more similar than the first object and the third object, and a second response option indicating that the first object and the third object are more similar than the first object and the second object. In some such embodiments, the plurality of response options further comprises a third response option indicating that the user is declining to provide the first response option and declining to provide the second response option.

An embodiment includes a computer program product comprising one or more computer readable storage media, and program instructions collectively stored on the one or more computer readable storage media, the program instructions executable by a processor to cause the processor to perform operations comprising generating a query prompting a user to select from among a plurality of response options related to a first query set of objects, where the first query set of objects are from object data that is representative of a plurality of objects. The embodiment also includes program instructions executable by the processor to cause the processor to receive, responsive to the query, user input representative of a selected response option selected by the user from among the plurality of response options. The embodiment also includes program instructions executable by the processor to cause the processor to calculate, responsive to the user input, a plurality of weight values for respective ones of a plurality of similarity matrices based on the selected response option, where the plurality of similarity matrices include respective different sets of similarity values, each set of similarity values comprising similarity values representative of similarities of respective pairs of the plurality of objects. The embodiment also includes program instructions executable by the processor to cause the processor to store a designated similarity matrix from among the plurality of similarity matrices, the designated similarity matrix being designated from among the plurality of similarity matrices based at least in part on a weight value from among the plurality of weight values assigned to the designated similarity matrix. Other embodiments of this aspect include corresponding computer systems, apparatus, and computer programs recorded on one or more computer storage devices, each configured to perform the actions of the embodiment.

An embodiment includes a computer system comprising a processor and one or more computer readable storage media, and program instructions collectively stored on the one or more computer readable storage media, the program instructions executable by the processor to cause the processor to perform operations comprising generating a query prompting a user to select from among a plurality of response options related to a first query set of objects, where the first query set of objects are from object data that is representative of a plurality of objects. The embodiment also includes program instructions executable by the processor to cause the processor to receive, responsive to the query, user input representative of a selected response option selected by the user from among the plurality of response options. The embodiment also includes program instructions executable by the processor to cause the processor to calculate, responsive to the user input, a plurality of weight values for respective ones of a plurality of similarity matrices based on the selected response option, where the plurality of similarity matrices include respective different sets of similarity values, each set of similarity values comprising similarity values representative of similarities of respective pairs of the plurality of objects. The embodiment also includes program instructions executable by the processor to cause the processor to store a designated similarity matrix from among the plurality of similarity matrices, the designated similarity matrix being designated from among the plurality of similarity matrices based at least in part on a weight value from among the plurality of weight values assigned to the designated similarity matrix. Other embodiments of this aspect include corresponding computer systems, apparatus, and computer programs recorded on one or more computer storage devices, each configured to perform the actions of the embodiment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
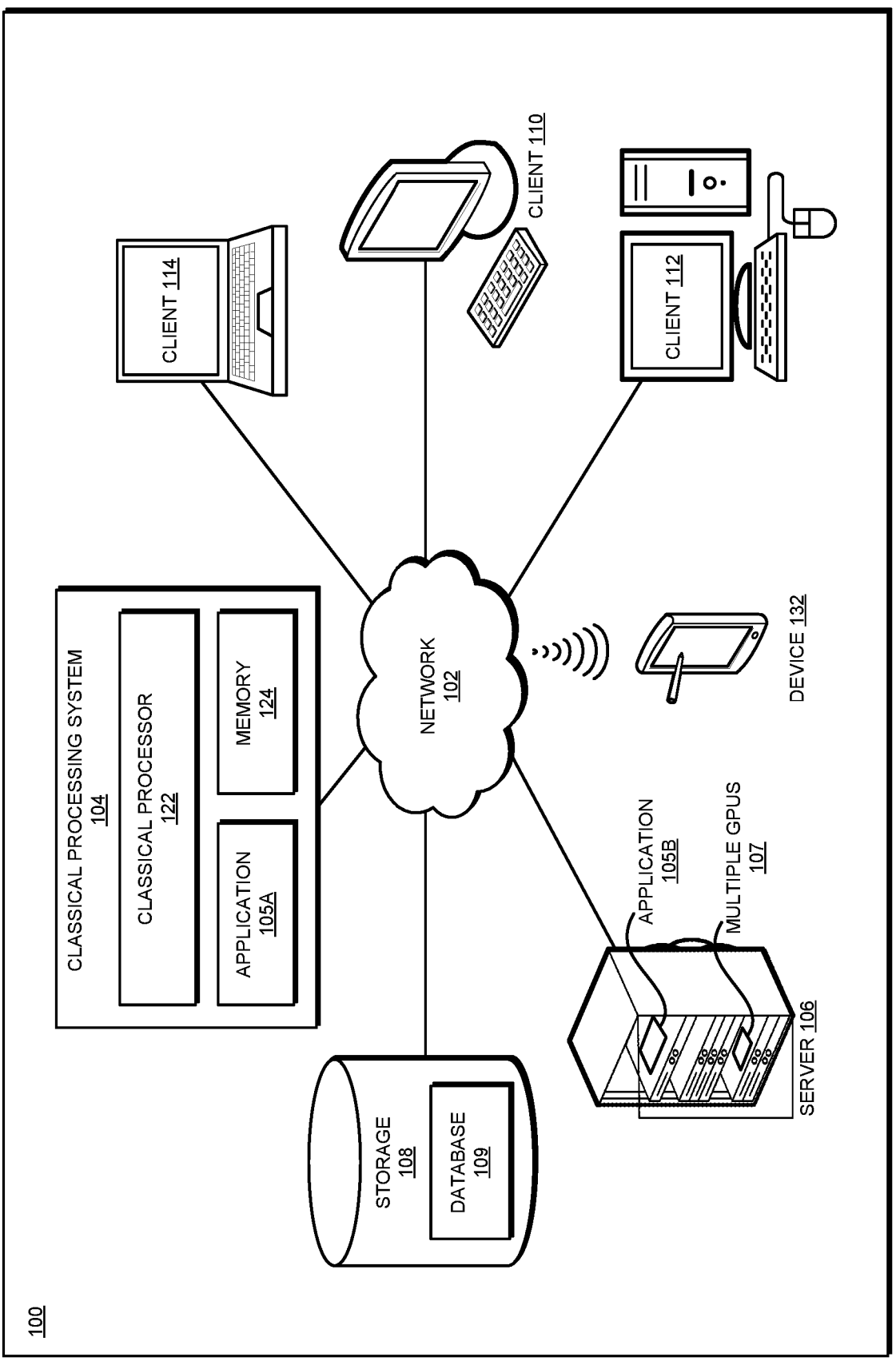
FIG. 1 depicts a block diagram of a network of data processing systems in which illustrative embodiments may be implemented.

The illustrated embodiments recognize that the choice of which similarity metric to use, as well as data representation, is often nontrivial due to the task-specific and subjective nature of the decision. There is no specific metric that works well for all tasks, and the design choices—such as parameters, distance metric, underlying corpus etc.—are typically predefined without taking into consideration the user's perspective. The illustrated embodiments recognize that, from a user's perspective, the notion of similarity might not coincide with distances found in literature or preselected metrics.

Thus, the illustrated embodiments involve a user in the process of selecting a designated similarity matrix from the perspective of the user in the process of selecting a similarity matrix, which advantageously improves the correlation between the resulting designated similarity matrix and the user's notion of similarity. For example, in some embodiments, one or more queries are presented to a user, and the user's responses are used to select a similarity matrix. In some such embodiments, the queries include one or more questions on similarities between triplets of objects, for example: "Is A closer to B than C?" The user's response influences the final selection of a designated similarity matrix, so that the designated similarity matrix will reflect the user's notion of similarity.

Illustrative embodiments include a matrix selection application that receives object data for a set of objects, and receives a plurality of predefined distance matrices. The distance matrices, also referred to herein as similarity matrices, are based on "multiple views" of the same set of objects, and therefore include respective sets of similarity distance values for pairs of objects in the same set of objects.ss The matrix selection application solicits responses from a user to a series of triplet queries in order to select a similarity matrix that most closely coincides with the user's notion of similarity for the set of objects. In some embodiments, the matrix selection algorithm assigns weight values to each of the matrices, and as the user provides responses to queries, the weight values increase for similarity matrices that agree with the user response. After a prescribed number of queries, the matrix selection algorithm selects the similarity matrix having the highest weight value as the similarity matrix that most closely coincides with the user's notion of similarity.

In some embodiments, the matrix selection application employs a contextual bandit algorithm to try to identify a closest similarity matrix using a minimal number of user queries. The contextual bandit algorithm uses a consensus reward strategy that advantageously assigns importance to discriminative views by increasing the reward as the number of agreeing similarity matrices decreases, and thereby also diminishes the contribution of noisy views by decreasing the reward as the number of agreeing similarity matrices increases. In some embodiments, the reward affects the weight values of the similarity matrices, so rewarded similarity matrices gain higher weight values.

In some embodiments, the application generates a series of queries that are each presented to a user. The queries are triplet queries that ask the user to identify whether a first object is more similar to a second object or more similar to a third object. In some embodiments, the object data may include data representative of objects that are not related to each other in any meaningful way, resulting in the potential for a triplet query that is confusing for the user. For example, the objects may include a first cluster of objects that are appliances, a second cluster of objects that are fruit, and a third cluster of objects that are animals. In this example, a potential triplet query may ask for a similarity comparison of objects that are not comparable in a meaningful way, such as "Is Toaster closer to Apple or Giraffe?". This is an example of an invalid question because either response would be equally non-applicable to the user's notion of similarity. Therefore, in some embodiments, the response options advantageously include a response option that allows the user to effectively bypass the question, which avoids an otherwise mandatory response from the user that would introduce undesirable noise into the matrix selection process. In some such embodiments, if the application receives a user input indicating that the user is bypassing the question, the application applies a negative reward to similarity matrices that suggest a relationship between the objects in the triplet query. As a result, weight values decrease for similarity matrices that receive a negative reward, reducing the likelihood that those similarity matrices coincide with the user's notion of similarity.

In some embodiments, the distance matrices can be defined by letting $X=\{x_n\}_{n=1}^N$ denote a set of N objects, and letting $\mathcal{M}=\{D^m\}_{m=1}^M$ denote a set of distance matrices. Each distance matrix $D^m=[D_{i,j}^m=d_m(x_i, x_j)]\in\mathbb{R}^{N\times N}$, $m=1,\ldots,M$ encodes pairwise distances over the set of objects X in different underlying metric spaces $(\mathcal{Z}_m, d_m)$, with the interpretation that either the vector representations of the objects based on different features produce different sets $Z_m$, or the underlying metrics $d_m$ differ but the vector representations are common, or both $Z_m$ and $d_m$ might differ as m varies. In such embodiments, each distance matrix captures similarities between the objects with respect to a particular abstract semantic aspect such as color, taste, shape, etc.

In some embodiments, the matrix selection algorithm is a contextual bandit algorithm that models the user as an oracle Q that represents latent domain knowledge and, consequently, a hidden relationship between these objects, represented as an unknown function $$\delta^Q : X \times X \times X \to \{0, 1\}.$$

The oracle is constrained to reply on relative distance comparisons. In practice, the oracle is usually a user, often a subject matter expert, or other source of ordinal information.

A relative comparison for some (ordered) triplet $(x_i, x_j, x_k)\in X^3$, otherwise termed as ordinal query, is a question of the form "is object $x_i$ closer to $x_j$ than to $x_k$?". In some embodiments, a positive answer by the oracle corresponds to $\delta^Q(x_i, x_j, x_k)=1$ and corresponds to $d(x_i,x_j)<d(x_i,x_k)$. Here, denotes an underlying metric associated with $\delta^Q$ and modeling the oracle's answers. In some embodiments, a set of all possible ordinal queries over X as $T_x=\{(xi, xj, xk)_\tau\}_{\tau=1}^T$ for an arbitrary but otherwise fixed enumeration with $$T = N\binom{N-1}{2}.$$

Thus, the $\tau^{th}$ triplet $(x_i, x_j, x_k)_\tau$ is satisfied in the $m^{th}$ metric space if $D_{ij}^m < D_{ik}^m$.

In some embodiments, a triplet selection strategy selects a triplet of objects for each user query. In some embodiments, the triplet selection strategy selects a triplet of objects for a user query using random selection. However, random selection is far from optimal, so in some embodiments a proposed adaptive triplet selection strategy generates one user query for each iteration, where the number of iterations is bound by budget parameter B, which is a maximum number of iterations.

In some such embodiments, the proposed adaptive triplet selection application selects a triplet of objects according to a selection strategy that minimizes the number of queries presented to the user so that the matrix selection application can identify the similarity matrix that is closest to the user's notion of similarities. For example, in some such embodiments, the matrix selection application selects a triplet of objects according to expression (1):

$$\tau_*^t \in \arg\max_{\tau^t \in \mathcal{T}^t}\left[\mathrm{diag}\left(M\mathbb{1}_T - \sum_{m=1}^M O^m\right)\sum_{m=1}^M O^m\right]_{\tau^t} \quad (1)$$

In expression (1), $M=\{1, 2, \ldots, m\}$ represents the total number of similarity matrices, $O^m$ is a set of ordinal vectors corresponding to respective similarity matrices M, T represents the total number of user queries, $\mathbb{1}_T$ is the T×1 all-ones vector, and $\mathcal{T}^t$ is as follows:

$$\mathcal{T}^t = \{1, \ldots, T\}\backslash\{\tau_*^1, \ldots, \tau_*^{t-1}\}$$

where $\tau_*^t$ represents a triplet query.

In some embodiments, the matrix selection application receives object data and similarity matrices with a request for a user-specific input for a machine-learning algorithm. In some such embodiments, the matrix selection application interfaces with a user interface, which in some embodiments includes a graphical user interface (GUI). In some embodiments, the GUI allows a user to submit a response as a user input in response to each user query. In some embodiments, the user interface allows the user to submit a request for user-specific input for a machine-learning algorithm. For example, in some embodiments, the user interface includes form input elements that a user can populate with data that will be submitted as form data to submit the request for user-specific input for a machine-learning algorithm.

In some embodiments, the GUI allows a user to set or modify configuration parameters to supplement or modify automated configuration settings, such as budget B and reward parameter q. In some embodiments, the GUI allows a user to select or create a memory location or target database for storing data used and produced by the application. In alternative embodiments, the user interface includes a command line interface in place of, or in addition to, the GUI with some or all of the functionality described in connection with the GUI.

In some such embodiments, the matrix selection application selects a similarity matrix from among the input similarity matrices that most closely coincides with the user's notion of similarity. In some such embodiments, the matrix selection application outputs the selected similarity matrix to the user via a user interface, for example via a graphical user interface (GUI). In some such embodiments, the matrix selection application outputs the selected similarity matrix to a machine-learning algorithm. In some embodiments, the matrix selection application outputs a pointer to the machine-learning algorithm, where the pointer identifies a memory location where the machine-learning algorithm can access the selected similarity matrix.

An embodiment includes a computer program product comprising one or more computer readable storage media, and program instructions collectively stored on the one or more computer readable storage media, the program instructions executable by a processor to cause the processor to perform any or all of the operations described herein related to identifying a similarity matrix for derived perceptions. In some embodiments, the computer program product includes stored program instructions that are stored in a computer readable storage device in a server data processing system, and the stored program instructions may be downloaded in response to a request over a network to a remote data processing system for use in a computer readable storage device associated with the remote data processing system. In some such embodiments, the stored program instructions include program instructions to meter use of the program instructions associated with the request. Further, in some such embodiments, the stored program instructions also include program instructions to generate an invoice based on the metered use.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
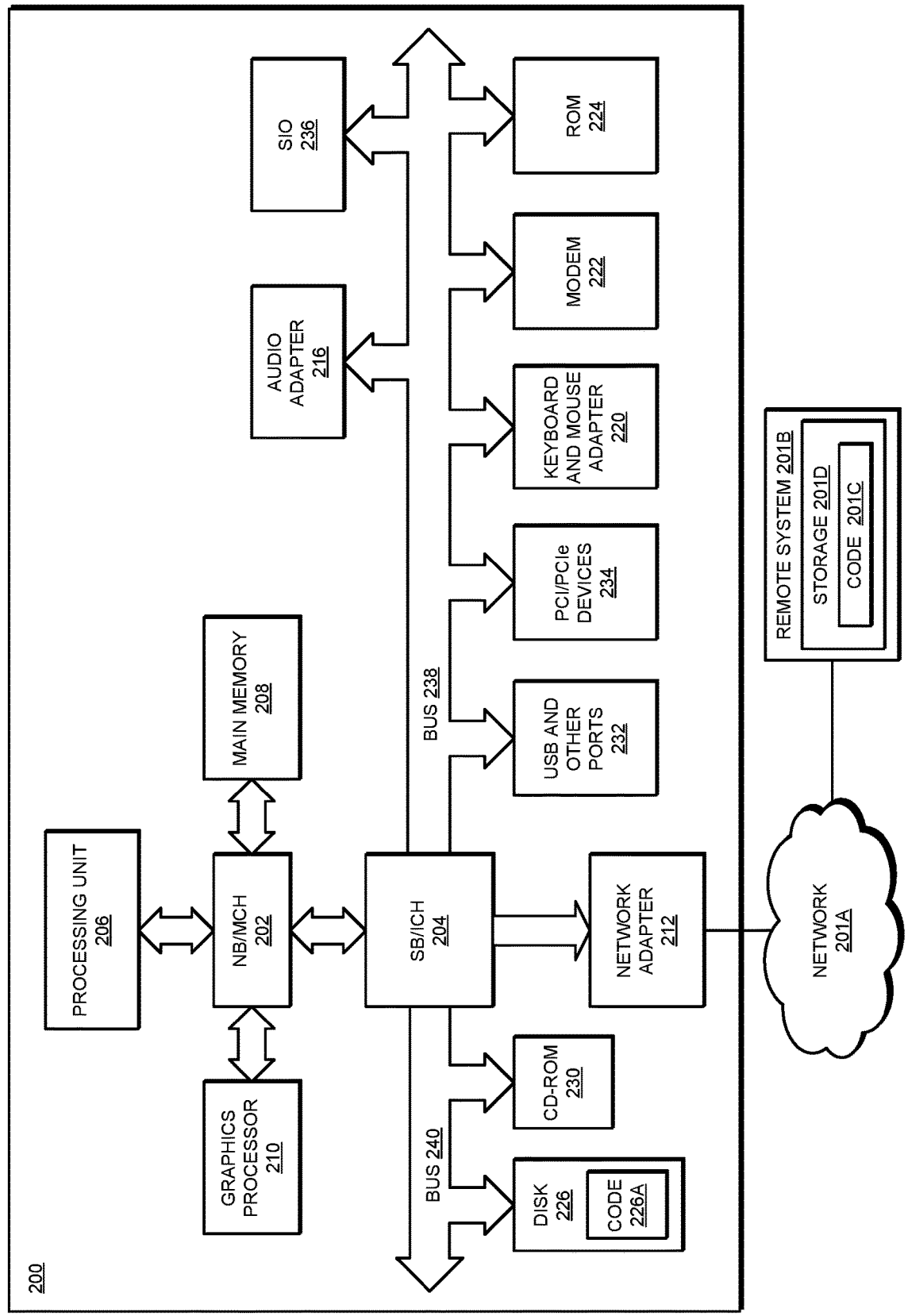
FIG. 2 depicts a block diagram of a data processing system in which illustrative embodiments may be implemented.

With reference to the figures and in particular with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the matrix selection applications, machine-learning applications, or other data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the matrix selection applications, machine-learning applications, or other data processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein of a matrix selection application, machine-learning application, or other data processor function described herein in accordance with one or more embodiments. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions are located or executed for implementing matrix selection applications, machine-learning applications, or other data processor functions described herein in accordance with one or more embodiments.

Data processing system 200 is also representative of a conventional data processing system or a configuration therein, such as conventional data processing system 132 in FIG. 1 in which computer usable program code or instructions are located or executed for implementing matrix selection applications, machine-learning applications, or other data processor functions described herein in accordance with one or more embodiments. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105A and 105B in FIG. 1, such as instructions for implementing matrix selection applications, machine-learning applications, or other data processor functions described herein in accordance with one or more embodiments, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIG. 1-2 may vary depending on the implementation. Other internal hardware or peripheral devices, such as flash memory, equivalent non-volatile memory, or optical disk drives and the like, may be used in addition to or in place of the hardware depicted in FIG. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
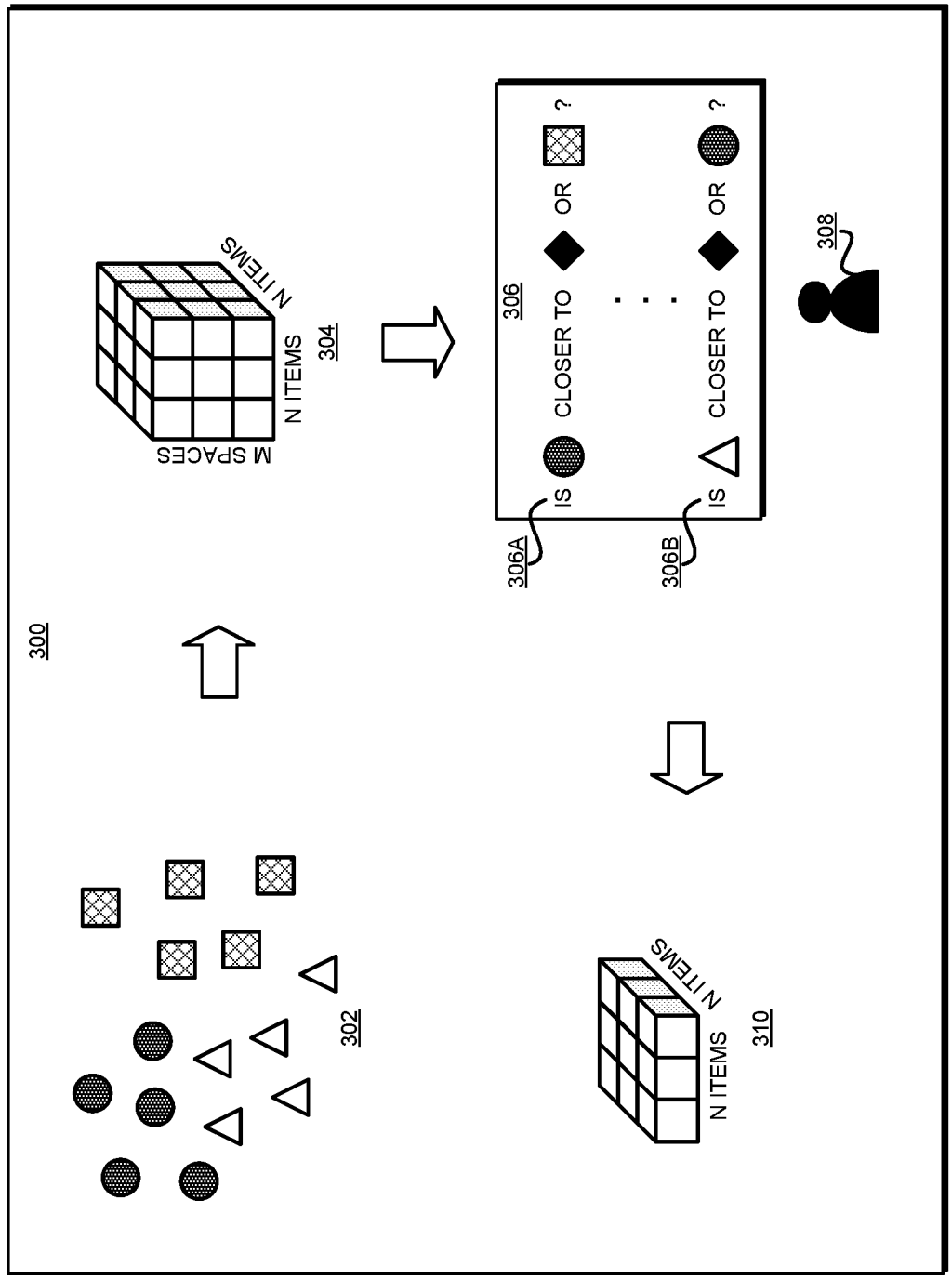
FIG. 3 depicts a general block diagram of an example matrix selection application in accordance with an illustrative embodiment.

With reference to FIG. 3, this figure depicts a general block diagram of an example matrix selection application 300 in accordance with an illustrative embodiment. In a particular embodiment, the example matrix selection application 300 is an example of applications 105A and 105B of FIG. 1. In some embodiments, the matrix selection application 300 is executed in processing system 104 in FIG. 1 using data or information stored or produced in data processing system 104 in FIG. 1.

In the illustrated embodiment, a set of objects 302 may form M different similarity matrices 304 according to respective "multiple views" of the same set of objects 302. For example, a set of clothing items can be organized by color or by season, or a set of furniture can be organized by room or style. In the illustrated embodiment, the matrix selection application 300 is an adaptive human-in-the-loop system that takes into account the similarity of objects 302 across different spaces and helps a user 308 find the similarity matrix that best matches the user's perspective or notion of similarity.

In the illustrated embodiment, the matrix selection application 300 uses a series of user queries 306 to identify a designated similarity matrix 310 from among the input similarity matrices 304. The matrix selection application 300 asks questions, for example the illustrated questions 306A and 306B, of the form "Is cat more similar to dog or mango?" from which the matrix selection application 300 specifies the relative distance of objects that align with the user view. The matrix selection application 300 then identifies the designated similarity matrix 310 that best coincides with the user's responses to the user queries 306.

Figure 4:
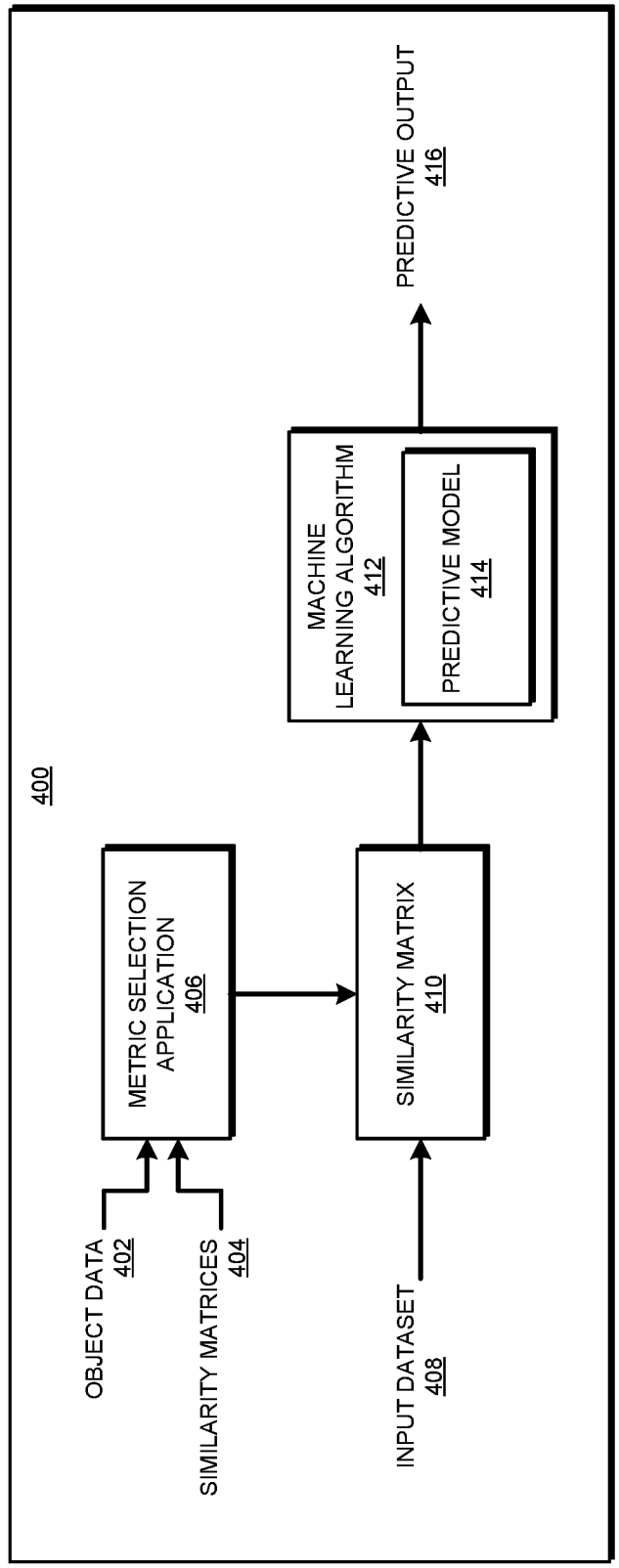
FIG. 4 depicts a system block diagram of an example artificial intelligence system in accordance with an illustrative embodiment.
Figure 7:
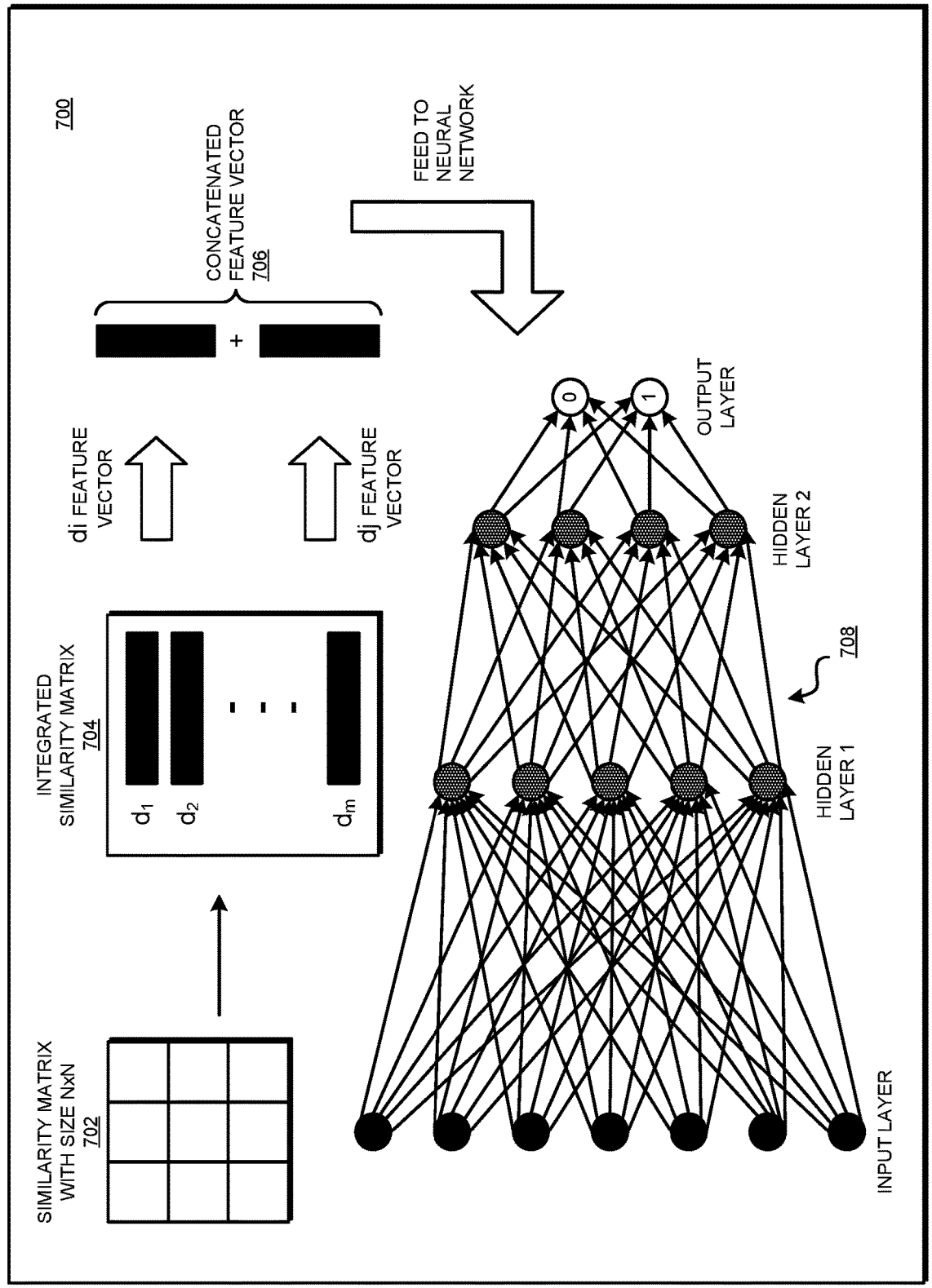
FIG. 7 depicts a block diagram of an example machine-learning algorithm in accordance with an illustrative embodiment.
Figure 8:
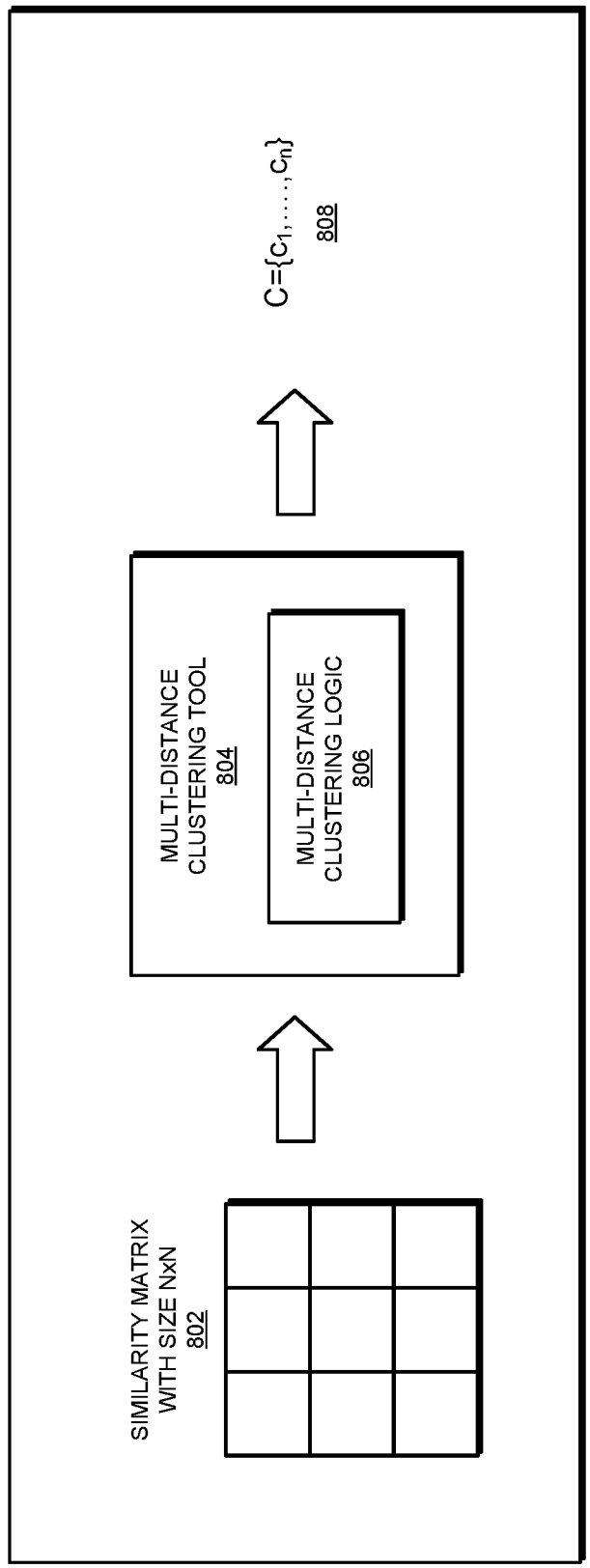
FIG. 8 depicts a block diagram of an example machine-learning algorithm in accordance with an illustrative embodiment.
Figure 9:
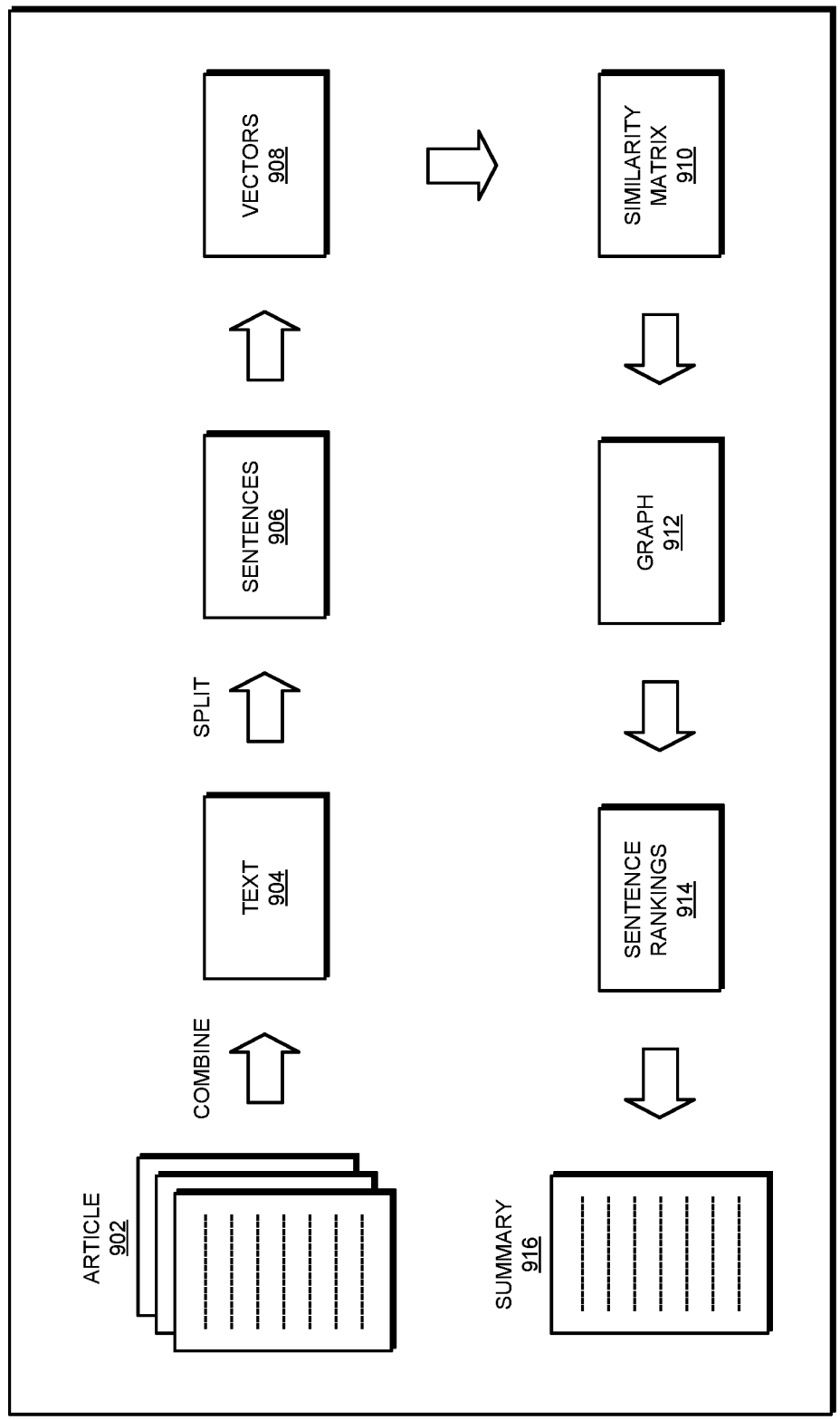
FIG. 9 depicts a block diagram of an example machine-learning algorithm in accordance with an illustrative embodiment.

With reference to FIG. 4, this figure depicts a system block diagram of an example artificial intelligence system 400 in accordance with an illustrative embodiment. In the illustrated embodiment, the artificial intelligence system 400 includes a matrix selection application 406 and a machine learning algorithm 412. In a particular embodiment, the example matrix selection application 406 is an example of matrix selection application 300 of FIG. 3 and applications 105A and 105B of FIG. 1. In some embodiments, the machine learning algorithm 412 includes a machine learning algorithm as shown in FIG. 7-9. In some embodiments, the artificial intelligence system 400 is executed in processing system 104 in FIG. 1 using data or information stored or produced in data processing system 104 in FIG. 1.

In the illustrated embodiment, a matrix selection application 406 receives object data 402 representative of a set of objects and receives a set of similarity matrices 404 associated with respective "multiple views" of the set of objects in the object data 402. The matrix selection application 406 identifies a designated similarity matrix 410 according to embodiments described herein. The designated similarity matrix 410 is input with input data 408 to the machine learning algorithm 412. For example, in some embodiments, the machine learning algorithm 412 includes a predictive model 414 that is based at least in part on the designated similarity matrix 410. The machine learning algorithm 412 uses the predictive model 414 to process the input dataset 408 and provide a predictive output 416.

Figure 5:
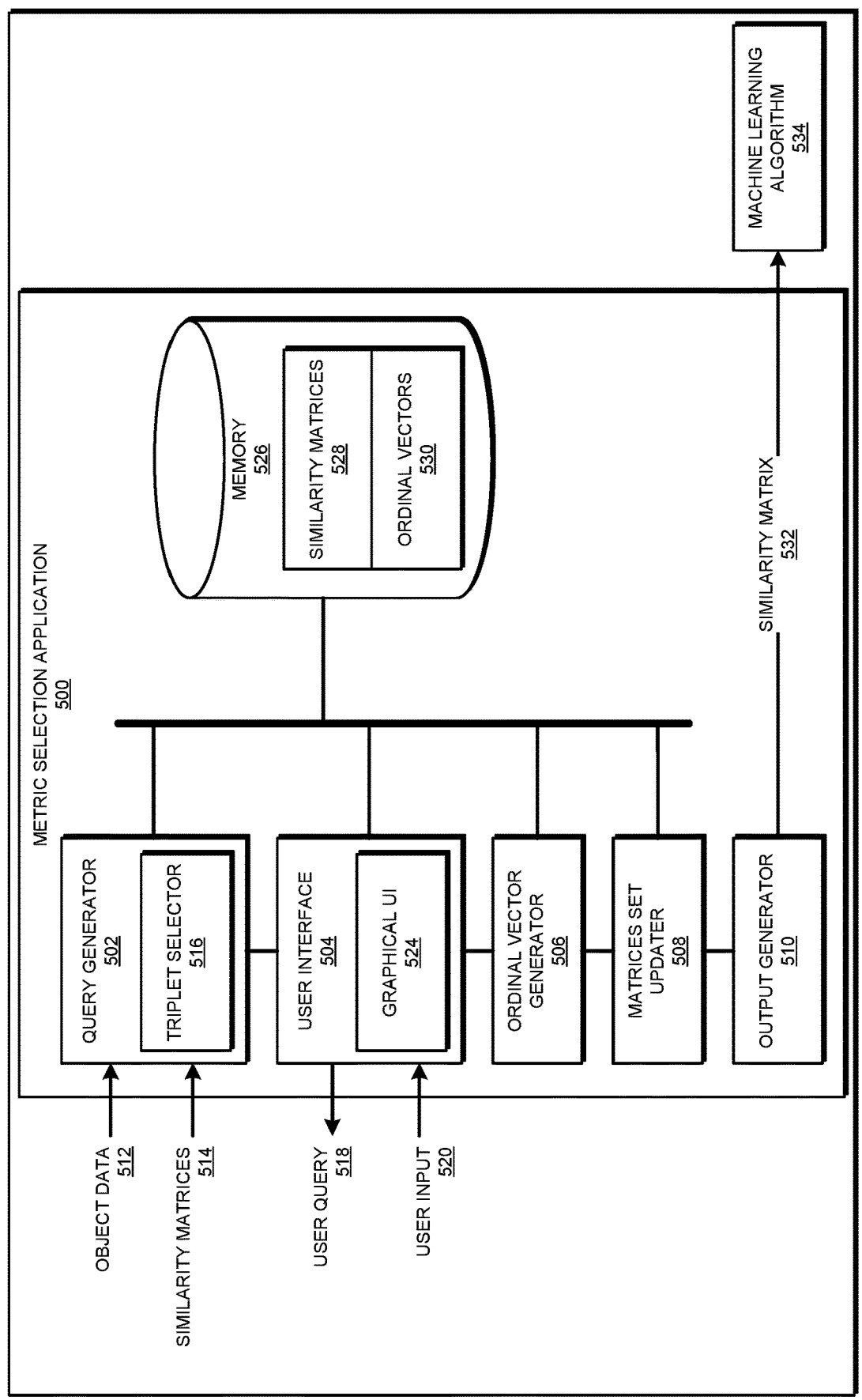
FIG. 5 depicts a system block diagram of an example matrix selection application in accordance with an illustrative embodiment.

With reference to FIG. 5, this figure depicts a system block diagram of an example matrix selection application 500 in accordance with an illustrative embodiment. In a particular embodiment, the example matrix selection application 500 is an example of matrix selection application 300 of FIG. 3 and applications 105A and 105B of FIG. 1. In some embodiments, the application 500 is executed in processing system 104 in FIG. 1 using data or information stored or produced in data processing system 104 in FIG. 1.

In the illustrated embodiment, the matrix selection application 500 comprises a query generator 502, a user interface 504, an ordinal vector generator 506, a matrices set updater 508, an output generator 510, and memory 526. In alternative embodiments, the matrix selection application 500 can include some or all of the functionality described herein but grouped differently into one or more systems or modules. In some embodiments, the functionality described herein is distributed among a plurality of systems, which can include combinations of software and/or hardware-based systems, for example Application-Specific Integrated Circuits (ASICs), computer programs, or smart phone applications. For example, in the illustrated embodiment, the memory 526 stores similarity matrices 528 and ordinal vectors 530. In alternative embodiments, the similarity matrices 528 and/or the ordinal vectors 530 are stored in remote memory, for example in database 109 of storage unit 108, and are accessible via a computer network.

In some embodiments, the query generator 502 receives object data 512 and a plurality of similarity matrices M 514 and generates a series of user queries selected to illicit responses from the user that are used to identify a designated similarity matrix from among the similarity matrices M that most closely coincides with the user's notion of similarity. In some embodiments, the query generator 502 receives the object data 512 and plurality of similarity matrices M 514 as part of a request for user-specific input for a machine-learning algorithm. In some embodiments, the query generator 502 initializes parameters, such as budget B and reward parameter n, in preparation for generating a user query. In some embodiments, the query generator 502 stores the similarity matrices in memory 526 and related parameter data as similarity matrices data 528.

In some embodiments, the query generator 502 initializes a weight $w_m$ for each of the similarity matrices M in preparation for generating a user query. For example, in some embodiments, the query generator 502 initializes a weight $w_m$ for each of the similarity matrices M according to $w_m(0)=1$, $\forall m \in M$. Each weight represents how well its corresponding similarity matrix coincides with the user's notion of similarity, or how preferable the user would consider a similarity matrix. In some embodiments, the query generator 502 initially sets the weights to be equal, and as the application 500 progresses through iterations of user queries, the weights will gradually change such that weights for more preferable similarity matrices will be higher that weights of less preferable similarity matrices, and this will eventually allow an optimal similarity matrix to be selected based on its weight value exceeding weights of other similarity matrices.

In some embodiments, the query generator 502 also normalizes the weights of all of the plurality of similarity matrices. For example, in some embodiments, the weights are normalized so that they become probability values such that the sum of all weights $w_m$ will equal an equivalent to 100%, such as 1.0.

In some embodiments, the query generator 502 also calculates a probability distribution that is used to enforce a consensus reward strategy. In the illustrated embodiment, the application 500 presents a series of triplet queries to a user in the form of "Is A closer to B or C?". As an example, suppose the user responds to the query by indicating that A is closer to B than to C. Given a diverse set of similarity matrices, there will be some similarity matrices that have a distance between A and B that is shorter than a distance between A and C, which agrees with the user response. There will be other similarity matrices that have a distance between A and B that is greater than a distance between A and C, which is not in agreement with the user response. The application 500 will reward those similarity matrices that agree with the user, which will increase the weight of the similarity matrices that are rewarded. In some embodiments, the amount of the reward is calculated according to a consensus reward strategy in which the amount of the reward depends on the number of similarity matrices that agree with the user. The consensus reward strategy assigns importance to discriminative views by increasing the reward as the number of agreeing similarity matrices decreases, and diminishes the contribution of noisy views by increasing the reward as the number of agreeing similarity matrices increases. The application 500 accomplishes this by calculating a preliminary reward value $r(a^m(t))$ and then adjusting the preliminary reward value based on a ratio $p_m(t)/q(t)$ where $p_m(t)$ the weight probability, $q(t) = \Sigma_{m=1}^{M} p_m(t) \, a^m(t)$ triplet selection probability, and $a^m(t)$ is a T×1 scores vector for matrix m and all triplets, with $$T = N\binom{N-1}{2}.$$

In the illustrated embodiment, the query generator 502 generates a triplet query as a user query 518 that is presented to the user via user interface 504 with a prompt for the user to select from among a plurality of response options related to the presented triplet query. For example, in some embodiments, the response options for a triplet query involving a first object A, a second object B, and a third object C, include:

A first response option indicating that A and B are more similar than A and C

A second response option indicating that A and C are more similar than A and B In some embodiments, the object data may include data representative of objects that are not related to each other in any meaningful way, resulting in the potential for a triplet query that is confusing for the user. For example, the objects may include a first cluster of objects that are appliances, a second cluster of objects that are fruit, and a third cluster of objects that are animals. For this example, the query generator 502 may generate a triplet query such as "Is Toaster closer to Apple or Giraffe?". This is an example of an invalid question, and if the user is required to make a choice, the user's selection would not be meaningful and would introduce invalid selection data into the algorithm. Therefore, in some embodiments, the response options include an additional response option that allows the user to bypass the question because either choice made by the user would be inconsequential or irrelevant to the goal of finding a similarity matrix that most closely coincides with the user's notions of similarity. For example, in embodiments, the response options for a triplet query involving a first object A, a second object B, and a third object C, include:

A first response option indicating that A and B are more similar than A and C

A second response option indicating that A and C are more similar than A and B

A third response option indicating that the similarity comparison is inconsequential In some such embodiments, if the application receives a user input indicating that the user is bypassing the question, the application applies a negative reward to similarity matrices that suggest a relationship between the objects in the triplet query. As a result, weight values decrease for similarity matrices that receive a negative reward, reducing the likelihood that those similarity matrices coincide with the user's notion of similarity.

In some embodiments, the query generator 502 includes a triplet selector 516 that selects a triplet of objects for the user query 518. In some embodiments, the triplet selector 516 selects a triplet of objects for a user query 518 using random selection. However, random selection is far from optimal, so in some embodiments the user query 518 generates one user query 518 for each iteration, where the number of iterations is bound by budget parameter B, which is a maximum number of iterations. In some such embodiments, the triplet selector 516 selects a triplet of objects according to a selection strategy that minimizes the number of queries presented to the user so that the application 500 can identify the similarity matrix that is closest to the user's notion of similarities. For example, in some such embodiments, the triplet selector 516 selects a triplet of objects according to expression (1):

$$\tau_*^t \in \arg\max_{\tau^t \in \mathcal{T}^t} \left[ \text{diag}\left( M\mathbb{1}_T - \sum_{m=1}^{M} O^m \right) \sum_{m=1}^{M} O^m \right]_{\tau^t} \quad (1)$$

In expression (1), M = {1, 2, . . . , m} represents the total number of similarity matrices, $O^m$ is a set of ordinal vectors corresponding to respective similarity matrices M, T represents the total number of user queries, $\mathbb{1}_T$ is the T×1 all-ones vector, and $\mathcal{T}^t$ is as follows:

$$\mathcal{T}^t = \{1, \ldots, T\} \setminus \{\tau_*^1, \ldots, \tau_*^{t-1}\}$$

where $\tau_*^t$ represents a triplet query.

In some embodiments, the user interface 504 includes a graphical user interface (GUI) 524. The GUI 524 allows a user to submit a response as a user input 520 in response to each user query 518. In some embodiments, the user interface user interface 504 also allows the user to submit a request for user-specific input for a machine-learning algorithm. For example, in some embodiments, the user interface 504 includes form input elements that a user can populate with data that will be submitted as form data to submit the request for user-specific input for a machine-learning algorithm. In some embodiments, the GUI 524 allows a user to set or modify configuration parameters to supplement or modify automated configuration settings, such as budget B and reward parameter η. In some embodiments, the GUI 524 allows a user to select or create a memory location or target database for storing data used and produced by the application 500. In alternative embodiments, the user interface 504 includes a command line interface in place of, or in addition to, the GUI 524 with some or all of the functionality described in connection with the GUI 524.

In the illustrated embodiment, the ordinal vector generator 506 receives user input submitted by the user in response to the query where the user input is representative of one of the plurality of response options. In some embodiments, the ordinal vector generator 506 calculates reward values and updates weight values associated with each of the plurality of similarity matrices based on the user's response to the query. In some embodiments, the ordinal vector generator 506 stores the reward values and weight values in memory 526 as ordinal vectors data 530. The matrices set updater 508 identifies similarity matrices that agree with the user's response, applies reward values to the similarity matrices identified as agreeing with the user's response. In some embodiments, the matrices set updater 508 updates the weight values for the similarity matrices identified as agreeing with the user's response.

In the illustrated embodiment, the output generator 510 determines if the budget B has been exhausted. If not, the output generator 510 signals the query generator 502 to begin another user-query iteration using query generator 502, the triplet selector 516, the user interface 504, the GUI 524, the ordinal vector generator 506, and the matrices set updater 508 as described above. Otherwise, if the output generator 510 detects that the budget B has been exhausted (i.e., the number of completed user-query iterations is equal to the budget B), the output generator 510 identifies a designated similarity matrix 532 from among similarity matrices 514 that has the largest weighted value. In some embodiments, the output generator 510 stores the designated similarity matrix 532 in memory 526. In some embodiments, the output generator 510 outputs the similarity matrix 532 to the user via the user interface 504, for example via the GUI 524. In the illustrated embodiment, the output generator 510 outputs the similarity matrix 532 to a machine-learning algorithm 534. In some embodiments, the output generator 510 outputs a pointer to the machine-learning algorithm 534 where the pointer identifies a memory location where the machine-learning algorithm 534 can access the similarity matrix 532. Non-limiting examples of machine-learning algorithm 534 for which the designated similarity matrix 532 may be provided are shown in FIGS. 7-9 and described below.

Figure 6:
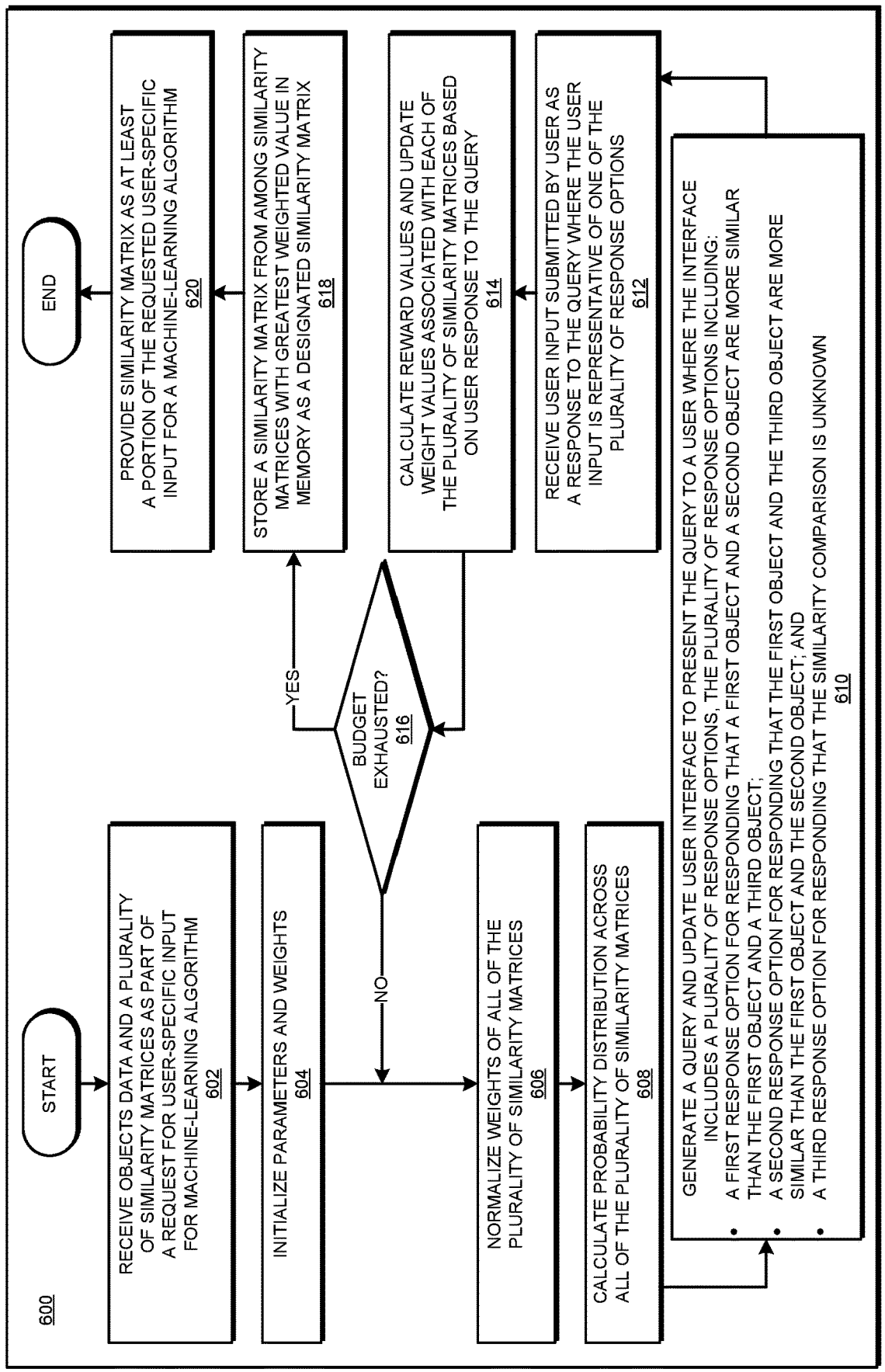
FIG. 6 depicts a flowchart of an example process for selecting a similarity matrix in accordance with an illustrative embodiment.

With reference to FIG. 6 this figure depicts a flowchart of an example process 600 for selecting a similarity matrix in accordance with an illustrative embodiment. In a particular embodiment, the matrix selection application 500 of FIG. 5 carries out the process 600.

In the illustrated embodiment, at block 602, the application 500 receives object data and a plurality of similarity matrices as part of a request for user-specific input for a machine-learning algorithm. Next, at block 604, the application 500 initializes parameters, such as budget B and reward parameter η. The application 500 also initializes a weight $w_m$ for each of the similarity matrices M, for example such that $w_m(0)=1$, $\forall m \in M$. Each weight represents how well its corresponding similarity matrix coincides with the user's notion of similarity, or how preferable the user would consider a similarity matrix. The weights are initially set to all be the same value, and as the application 500 progresses through iterations of blocks 606-616, the weights will gradually change such that weights for more preferable similarity matrices will be higher that weights of less preferable similarity matrices, and this will eventually allow a designated similarity matrix to be selected based on its weight value exceeding weights of other similarity matrices.

At block 606, the application 500 begins the first of a plurality of iterations of blocks 606-616, where the budget parameter B is the number of iterations. At block 606, the application 500 normalizes the weights of all of the plurality of similarity matrices. For example, in some embodiments, the weights are normalized so that they become probability values such that the sum of all weights $w_m$ will equal an equivalent to 100%, such as 1.0.

Next, at block 608, the application 500 calculates a probability distribution that is used to enforce a consensus reward strategy. In the illustrated embodiment, the application 500 presents a series of triplet queries to a user in the form of "Is A closer to B or C?". As an example, suppose the user responds to the query by indicating that A is closer to B than to C. Given a diverse set of similarity matrices, there will be some similarity matrices that have a distance between A and B that is shorter than a distance between A and C, which agrees with the user response. There will be other similarity matrices that have a distance between A and B that is greater than a distance between A and C, which is not in agreement with the user response. The application 500 will reward those similarity matrices that agree with the user, which will increase the weight of the similarity matrices that are rewarded. In some embodiments, the amount of the reward is calculated according to a consensus reward strategy in which the amount of the reward depends on the number of similarity matrices that agree with the user. The consensus reward strategy assigns importance to discriminative views by increasing the reward as the number of agreeing similarity matrices decreases, and lowers the contribution of noisy views by decreasing the reward as the number of agreeing similarity matrices increases. The application 500 accomplishes this by calculating a preliminary reward value and then adjusting the preliminary reward value $r(a^m(t))$ based on a ratio $p_m(t)/q(t)$ of the weight probability $p_m(t)$ calculated at block 606 to a triplet selection probability q(t) $q(t)=\Sigma_{m=1}^{M} p_m(t) a^m(t)$, where $a^m(t)$ is a T×1 scores vector for matrix m and all triplets, with $$T = N \binom{N-1}{2}.$$

Next, at block 610, the application 500 generates a triplet query that is presented to the user with a prompt for the user to select from among a plurality of response options related to the presented triplet query. For example, in some embodiments, the response options for a triplet query involving a first object A, a second object B, and a third object C, include:

A first response option indicating that A and B are more similar than A and C

A second response option indicating that A and C are more similar than A and B

In some embodiments, the object data may include data representative of objects that are not related to each other in any meaningful way, resulting in a triplet query that is confusing for the user. For example, the objects may include a first cluster of objects that are appliances, a second cluster of objects that are fruit, and a third cluster of objects that are animals. For this example, the application 500 may generate a triplet query such as "Is Toaster closer to Apple or Giraffe?". This is an example of an invalid question, and if the user is required to make a choice, the user's selection would not be meaningful and would introduce invalid selection data into the algorithm. Therefore, in some embodiments, the response options include an additional response option that allows the user to bypass the question because either choice made by the user would be inconsequential or irrelevant to the goal of finding a similarity matrix that most closely coincides with the user's notions of similarity. For example, in embodiments, the response options for a triplet query involving a first object A, a second object B, and a third object C, include:
- A first response option indicating that A and B are more similar than A and C
- A second response option indicating that A and C are more similar than A and B
- A third response option indicating that the similarity comparison is inconsequential In some such embodiments, if the application receives a user input indicating that the user is bypassing the question, the application applies a negative reward to similarity matrices that suggest a relationship between the objects in the triplet query. As a result, weight values decrease for similarity matrices that receive a negative reward, reducing the likelihood that those similarity matrices coincide with the user's notion of similarity.

Next, at block 612, the application 500 receives user input submitted by the user in response to the query where the user input is representative of one of the plurality of response options. At block 614 the application 500 calculates reward values and updates weight values associated with each of the plurality of similarity matrices based on the user's response to the query. In some embodiments, those similarity matrices that agree with the user's response are rewarded and, as a result, the weight values for those matrices are increased.

Next, at block 616, the application 500 determines if the budget B has been exhausted. If not, the process continues to block 606 for another iteration of blocks 606-616. Otherwise, if the budget B has been exhausted, the process continues to block 618.

At block 618, the application 500 stores a similarity matrix from among similarity matrices with greatest weighted value in memory as a designated similarity matrix. Then, at block 620, the application 500 provides the designated similarity matrix as at least a portion of the requested user-specific input for a machine-learning algorithm, and the process terminates. Non-limiting examples of such machine-learning algorithms for which the designated similarity matrix may be provided are shown in FIGS. 7-9 and described below.

With reference to FIG. 7, this figure depicts a block diagram of an example machine-learning algorithm 700 in accordance with an illustrative embodiment. In a particular embodiment, the example machine-learning algorithm 700 is an example of a machine-learning algorithm 412 of FIG. 4 and machine-learning algorithm 534 of FIG. 5. The machine-learning algorithm 700 uses a similarity matrix 702, which is an example of a similarity matrix 532 of FIG. 5.

In the illustrated embodiment, a similarity matrix 702 is an N×N matrix for N input objects that will be input into a neural network 708. The machine-learning algorithm 700 generates an integrated matrix 704, where every row d1-dn in the integrated matrix 704 is a feature vector of a corresponding input object. For each pair of the input objects, the corresponding feature vectors are concatenated into an input vector 706 and input to the input layer of the neural network 708. The neural network 708 is an artificial neural network, such as a convolutional neural network or other known type of artificial neural network. The neural network 708 is applied to the input vector 706 for any of a variety of known types of neural network processing, such as providing a classification or prediction output.

With reference to FIG. 8, this figure depicts a block diagram of an example machine-learning algorithm 800 in accordance with an illustrative embodiment. In a particular embodiment, the example machine-learning algorithm 800 is an example of a machine-learning algorithm 412 of FIG. 4 and machine-learning algorithm 534 of FIG. 5. The machine-learning algorithm 800 uses a similarity matrix 802, which is an example of a similarity matrix 532 of FIG. 5.

In the illustrated embodiment, a similarity matrix 802 is an N×N matrix for N input objects that will be input into a multi-distance clustering tool 804. The multi-distance clustering tool 804 outputs a number C clusters that are mutually dissimilar. The multi-distance clustering tool 804 includes multi-distance clustering logic 806. In an embodiment, the similarity matrix 802 includes pair-wise multi-distance similarities between respective pairs of data points in a data set, for example read from an electronic data structure.

In some embodiments, the similarity matrix 802 is stored in a database table or any other electronic data structure. The similarity matrix 802 is read by moving the similarity matrix 802 into working memory or cache that is accessible to a processor and/or logic performing the machine-learning algorithm 800.

In some embodiments, multi-distance clustering logic 806 clusters the dataset having pair-wise similarities recorded in the similarity matrix 802 as follows. First, the multi-distance clustering logic 806 selects a pair of similar data points to create an initial cluster. In one embodiment, the pair of data points having the highest positive similarity (e.g., as evidenced by the highest value in the similarity matrix 802) is selected as the initial pair. The cluster is grown by subsuming, into the cluster, data points that are similar to any point in the cluster. In some embodiments, a threshold is set for one level of similarity for adding a data point to a cluster. For example, given a similarity that ranges from −1 to 1, a similarity of +0.5 may be used as the threshold for adding a data point to a cluster.

When no un-clustered data points remain that are similar to data points in the cluster, a new pair of similar data points is selected to create a subsequent cluster. The subsequent cluster is grown by subsuming any data points that are similar to a data point in the subsequent cluster. This clustering is repeated until all points are in a cluster. Any data point that is not similar to any other data point is in a cluster by itself. In one embodiment, a given data point is allowed to be a member of more than one cluster. Note that the number of clusters is determined by the clustering process itself, which terminates when all points are in a cluster. The number of clusters does not need to be determined prior to clustering or otherwise input to the clustering process.

With reference to FIG. 9, this figure depicts a block diagram of an example machine-learning algorithm 900 in accordance with an illustrative embodiment. In a particular embodiment, the example machine-learning algorithm 900 is an example of a machine-learning algorithm 412 of FIG. 4 and machine-learning algorithm 534 of FIG. 5. The machine-learning algorithm 900 uses a similarity matrix 910, which is an example of a similarity matrix 532 of FIG. 5.

In the illustrated embodiment, the machine-learning algorithm 900 is an algorithm used to summarize documents. In some embodiments, the machine-learning algorithm 900 is a Natural Language Processing (NLP) algorithm that provides automatic text summarization. In such embodiments, the algorithm 900 includes a process of generating a summary of text from one or more text resources, such as books, news articles, blog posts, and other publications or bodies of text.

In the illustrated embodiment, the machine-learning algorithm 900 begins by combining all the text in documents 902 into a document at 904. Next, the machine-learning algorithm 900 splits the document 904 into individual sentences 906. The machine-learning algorithm 900 then generates vector representations 908 (e.g., words embedding) for each sentence 906. The machine-learning algorithm 900 then generates a similarity matrix 910 according to embodiments described herein, for example where the similarity matrix 910 is from a plurality of similarity matrices that were generated based on respective techniques for measuring the similarity between sentences 906.

Next, the machine-learning algorithm 900 converts the similarity matrix 910 into a graph 912, with sentences as vertices and similarity scores as edges. The graph 912 is then used to determine sentence rankings 914. The machine-learning algorithm 900 then generates a summary 916 of the documents 902 by selecting the most highly ranked n sentences according to sentence rankings 914. In some embodiments, the machine-learning algorithm 900 also includes a question answering (QA) implementation that receives and applies NLP to a natural language question posed by a user, and uses the information collected by summarizing documents to construct an answer for the user.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
initializing a budget value for iterative generation of a number of unique queries, the unique queries comprising respective unique query sets of objects;
generating a query prompting a user to select from among a plurality of response options related to a first query set of objects,
wherein the first query set of objects are from object data that is representative of a plurality of objects;
displaying the query to the user via a graphical user interface (GUI);
receiving, responsive to the query, user input via the GUI, the user input representative of a selected response option selected by the user from among the plurality of response options;
calculating, responsive to the user input, a plurality of weight values via a reward strategy for respective ones of a plurality of similarity matrices based on the selected response option, wherein the reward strategy comprises increasing the weight values based on a number of similarity matrices that agree with the selected response option,
wherein the plurality of similarity matrices include respective different sets of similarity values, each set of similarity values comprising similarity values representative of similarities of respective pairs of the plurality of objects;
repeating the generating of the query for a number of iterations that does not exceed the budget value, each iteration comprising prompting the user with respective unique query sets of objects; and
storing, on a selected storage medium, a designated similarity matrix from among the plurality of similarity matrices, the designated similarity matrix being designated from among the plurality of similarity matrices based at least in part on a highest weight value from among the plurality of weight values assigned to the designated similarity matrix.

2. The computer-implemented method of claim 1, further comprising:
receiving a request for a user-specific input for a machine learning algorithm, the request comprising at least a portion of the object data.

3. The computer-implemented method of claim 2, wherein the request further comprises at least one of the plurality of similarity matrices.

4. The computer-implemented method of claim 2, further comprising:
modifying input data for a machine-learning algorithm using the designated similarity matrix.

5. The computer-implemented method of claim 4, wherein the machine-learning algorithm includes natural language processing that processing text using the designated similarity matrix.

6. The computer-implemented method of claim 1, further comprising:
calculating, responsive to the user input, a plurality of reward values for respective ones of the plurality of similarity matrices based on the selected response option, wherein the reward values are based at least in part on the number of similarity matrices that agree with the selected response option.

7. The computer-implemented method of claim 1, wherein the first query set of objects comprises a first object, a second object, and a third object, and
wherein the plurality of response options comprises:
a first response option indicating that the first object and the second object are more similar than the first object and the third object; and
a second response option indicating that the first object and the third object are more similar than the first object and the second object.

8. The computer-implemented method of claim 7, wherein the plurality of response options further comprises a third response option indicating that the user is declining to provide the first response option and declining to provide the second response option.

9. A computer program product comprising one or more computer readable storage media, and program instructions collectively stored on the one or more computer readable storage media, the program instructions executable by a processor to cause the processor to perform operations comprising:
generating a query prompting a user to select from among a plurality of response options related to a first query set of objects,
wherein the first query set of objects are from object data that is representative of a plurality of objects;
displaying the query to the user via a graphical user interface (GUI);
receiving, responsive to the query, user input via the GUI, the user input representative of a selected response option selected by the user from among the plurality of response options;
calculating, responsive to the user input, a plurality of weight values via a reward strategy for respective ones of a plurality of similarity matrices based on the selected response option, wherein the reward strategy comprises increasing the weight values based on a number of similarity matrices that agree with the selected response option,
wherein the plurality of similarity matrices include respective different sets of similarity values, each set of similarity values comprising similarity values representative of similarities of respective pairs of the plurality of objects; and
storing, on a selected storage medium, a designated similarity matrix from among the plurality of similarity matrices, the designated similarity matrix being designated from among the plurality of similarity matrices based at least in part on a highest weight value from among the plurality of weight values assigned to the designated similarity matrix.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

12. The computer program product of claim 9, further comprising:
modifying input data for a machine-learning algorithm using the designated similarity matrix.

13. The computer program product of claim 9, wherein the first query set of objects comprises a first object, a second object, and a third object, and
wherein the plurality of response options comprises:
a first response option indicating that the first object and the second object are more similar than the first object and the third object; and
a second response option indicating that the first object and the third object are more similar than the first object and the second object.

14. The computer program product of claim 13, wherein the plurality of response options further comprises a third response option indicating that the user is declining to provide the first response option and declining to provide the second response option.

15. A computer system comprising a processor and one or more computer readable storage media, and program instructions collectively stored on the one or more computer readable storage media, the program instructions executable by the processor to cause the processor to perform operations comprising:
generating a query prompting a user to select from among a plurality of response options related to a first query set of objects,
wherein the first query set of objects are from object data that is representative of a plurality of objects;
displaying the query to the user via a graphical user interface (GUI);
receiving, responsive to the query, user input via the GUI, the user input representative of a selected response option selected by the user from among the plurality of response options;
calculating, responsive to the user input, a plurality of weight values via a reward strategy for respective ones of a plurality of similarity matrices based on the selected response option, wherein the reward strategy comprises increasing the weight values based on a number of similarity matrices that agree with the selected response option,
wherein the plurality of similarity matrices include respective different sets of similarity values, each set of similarity values comprising similarity values representative of similarities of respective pairs of the plurality of objects; and
storing, on a selected storage medium, a designated similarity matrix from among the plurality of similarity matrices, the designated similarity matrix being designated from among the plurality of similarity matrices based at least in part on a highest weight value from among the plurality of weight values assigned to the designated similarity matrix.

16. The computer system of claim 15, further comprising:
modifying input data for a machine-learning algorithm using the designated similarity matrix.

17. The computer system of claim 15, wherein the first query set of objects comprises a first object, a second object, and a third object, and
wherein the plurality of response options comprises:
a first response option indicating that the first object and the second object are more similar than the first object and the third object; and
a second response option indicating that the first object and the third object are more similar than the first object and the second object.

18. The computer system of claim 17, wherein the plurality of response options further comprises a third response option indicating that the user is declining to provide the first response option and declining to provide the second response option.

* * * * *